US009874907B2

(12) United States Patent
Wang

(10) Patent No.: US 9,874,907 B2
(45) Date of Patent: Jan. 23, 2018

(54) DISPLAY DEVICE

(71) Applicant: SAMSUNG DISPLAY CO., LTD., Yongin, Gyeonggi-Do (KR)

(72) Inventor: Ji Young Wang, Ulsan (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/725,880

(22) Filed: May 29, 2015

(65) Prior Publication Data
US 2016/0195905 A1  Jul. 7, 2016

(30) Foreign Application Priority Data
Jan. 7, 2015  (KR) .................. 10-2015-0001884

(51) Int. Cl.
*G06F 1/16* (2006.01)
*G06F 1/32* (2006.01)
*G02F 1/133* (2006.01)

(52) U.S. Cl.
CPC ........ *G06F 1/1684* (2013.01); *G02F 1/13318* (2013.01); *G06F 1/1637* (2013.01); *G06F 1/3231* (2013.01); *G06F 1/3265* (2013.01); *Y02B 60/1242* (2013.01); *Y02B 60/1289* (2013.01)

(58) Field of Classification Search
CPC .......... G06F 1/1684; G02B 5/305; G02B 1/14
USPC .................................................. 361/679.09
See application file for complete search history.

(56) References Cited

U.S. PATENT DOCUMENTS

| 9,442,605 | B2 * | 9/2016 | Yamada | G06F 3/03545 |
| 2008/0084523 | A1 * | 4/2008 | Oka | G02F 1/133528 349/96 |
| 2008/0094547 | A1 * | 4/2008 | Sugita | G02B 5/3058 349/96 |
| 2010/0182538 | A1 * | 7/2010 | Takata | G02B 5/208 349/64 |
| 2010/0315570 | A1 * | 12/2010 | Mathew | G06F 1/1637 349/58 |
| 2011/0248152 | A1 * | 10/2011 | Svajda | G01S 3/7803 250/221 |
| 2012/0243091 | A1 * | 9/2012 | Amm | G06F 1/1605 359/489.07 |

(Continued)

FOREIGN PATENT DOCUMENTS

| KR | 10-2010-0003198 A | 1/2010 |
| KR | 10-2013-0042682 A | 4/2013 |

(Continued)

*Primary Examiner* — Tuan T Dinh
*Assistant Examiner* — Rockshana Chowdhury
(74) *Attorney, Agent, or Firm* — Lee & Morse, P.C.

(57) ABSTRACT

A display device includes a cover window having a display region and a non-display region surrounding the display region on a same plane, an optical sensor member including a light emitting portion and a light receiving portion, the optical sensor member being adjacent a first surface of the cover window and overlaps the non-display region, a color layer at a portion of the first surface of the cover window facing the optical sensor member, the portion overlapping the non-display region, the color layer defining at least one hole corresponding to the optical sensor member, and a polarizing member at a portion of the first surface of the cover window exposed by the hole.

17 Claims, 11 Drawing Sheets

(56) References Cited

U.S. PATENT DOCUMENTS

| | | | | |
|---|---|---|---|---|
| 2014/0022492 A1* | 1/2014 | Lee | ................... | G02F 1/133528 349/68 |
| 2014/0213323 A1* | 7/2014 | Holenarsipur | ....... | H03K 17/955 455/566 |
| 2014/0357963 A1* | 12/2014 | Chang | ................... | A61B 5/6898 600/301 |

FOREIGN PATENT DOCUMENTS

| | | | |
|---|---|---|---|
| KR | 10-2013-0063570 A | 6/2013 | |
| KR | 10-2014-0003046 A | 1/2014 | |
| WO | WO 2012131739 A1 * | 10/2012 | ............... G02C 7/10 |

* cited by examiner

DISPLAY DEVICE

CROSS-REFERENCE TO RELATED APPLICATION

Korean Patent Application No. 10-2015-0001884, filed on Jan. 7, 2015, in the Korean Intellectual Property Office, and entitled: "Display Device," is incorporated by reference herein in its entirety.

BACKGROUND

1. Field

Embodiments relate to a display device, and more particularly, to a display device including a polarizing member.

2. Description of the Related Art

Various display devices, such as a television, a mobile phone, a navigation device, a computer monitor, and so forth, are being developed. Such a display device may include a display panel, a cover window, and an optical sensor member. The optical sensor member may be beneath the cover window and includes a light emitting unit and a light receiving unit. Whether to display an image on the display panel is determined in accordance with whether light emitted from the light emitting unit toward the cover window is reflected by an adjacent user or the like and detected by the light receiving unit. The light to be emitted is typically infrared light. Power consumption in the display devices may be reduced by the optical sensor members.

A color layer is formed in a part of an inside of the cover window corresponding to a non-display region of the cover window so that an interior of the display device may not be seen. The color layer has a hole for transmitting light emitted from the optical sensor member and reflected light.

A conventional display device is structured in that the inside of the cover window exposed by the hole is printed with an infrared ink layer so as to prevent the optical sensor member from being seen from outside, however, since the surface of the infrared ink layer is not flat, light from the light emitting unit may be scatter-reflected and the scatter-reflected light may then be applied to the light receiving unit to cause an erroneous operation of the optical sensor member.

SUMMARY

One or more embodiments is directed to a display device including a cover window having a display region and a non-display region surrounding the display region on a same plane, an optical sensor member including a light emitting portion and a light receiving portion, the optical sensor member being adjacent a first surface of the cover window and overlapping the non-display region, a color layer on a portion of the first surface of the cover window facing the optical sensor member, the portion overlapping the non-display region, the color layer defining at least one hole corresponding to the optical sensor member, and a polarizing member on the first surface of the cover window exposed by the hole.

Each polarizing film may include a polarizer, a first protective layer on a first surface of the polarizer, and a second protective layer on a second surface of the polarizer, opposite the first surface.

At least either the first protective layer or the second protective layer may be formed of triacetyl cellulose (TAC) or cellulose acetate trimellitate (CAT).

The polarizing member may include a first polarizing film and a second polarizing film, wherein an angle formed by a first polarizing direction of the first polarizing film and a second polarizing direction of the second polarizing film may be 45 degrees to 90 degrees.

The polarizing member may have a transmittivity of 80% or higher of infrared light having a wavelength of 940 nm or more.

The polarizing member may include a plurality of polarizing films laminated together.

A first adhesive layer may be interposed between the plurality of polarizing films.

A second adhesive layer may be interposed between the surface exposed by the hole and the polarizing member.

The polarizing member may have an area equal to that of the hole and may be fully inserted into the hole.

The polarizing member has an area wider than that of the hole and extends onto the color layer.

The light emitting portion and the light receiving portion may be arranged in parallel to the lengthwise direction of two relatively shorter edges among edges forming an interface between the display region and the non-display region.

The light emitting portion and the light receiving portion may be arranged in parallel to the lengthwise direction of two relatively longer edges among edges forming an interface between the display region and the non-display region.

The at least one hole may be two holes in the color layer, the two holes corresponding to the light emitting portion and the light receiving portion of the optical sensor member, respectively.

The polarizing member may be a single member that is wider than both holes.

The polarizing member may cover the color layer between the two holes.

The polarizing member may be on all portions of the first surface of the cover window exposed by the two holes.

The polarizing member may include two polarizing members corresponding to each of the two holes.

Each polarizing member may have an area wider than each hole and extends onto the color layer.

The at least one hole may be a single hole in the color layer that corresponds to both the light emitting portion and the light receiving portion of the optical sensor member.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
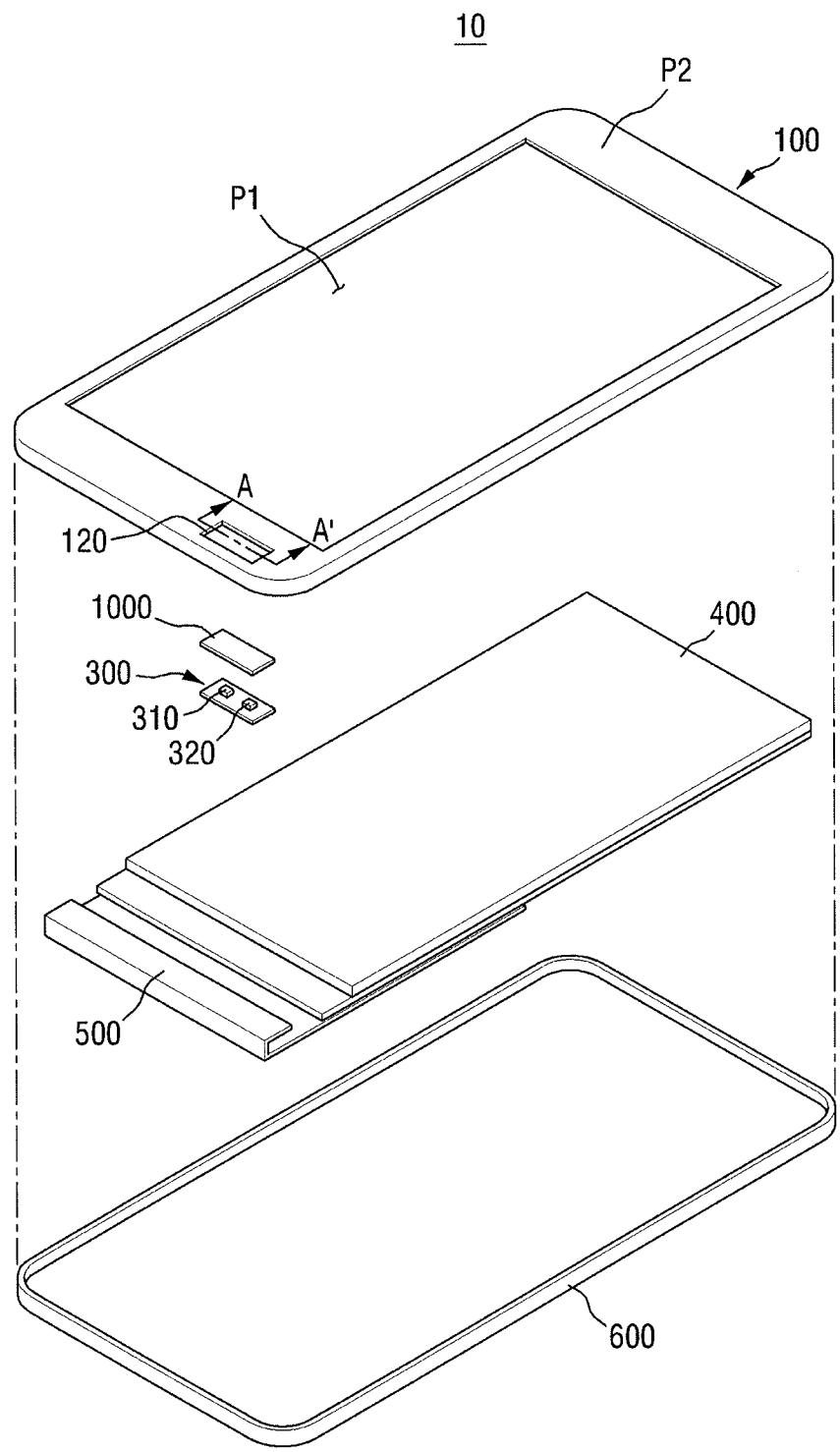
FIG. 1 illustrates an exploded perspective diagram of a display device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Display devices in the embodiments may be a variety of devices. For example, the display devices may be liquid crystal display devices or organic light emitting diode display devices. Hereinafter, cases where the display devices are organic light emitting diode display devices will be mainly explained for convenience of description.

Figure 2:
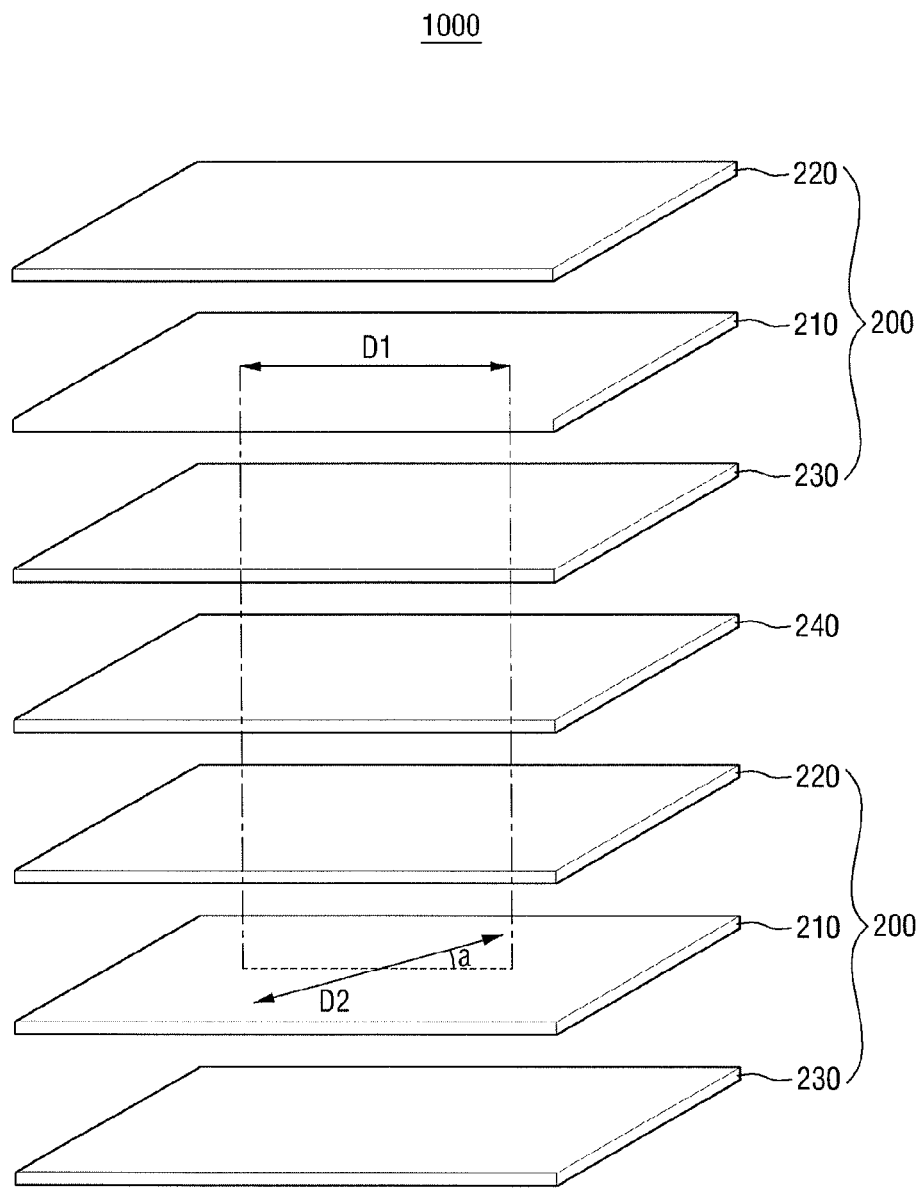
FIG. 2 illustrates a perspective view of a polarizing member according to the embodiment.
Figure 3:
FIG. 3 illustrates a cross-sectional view of the polarizing member according to the embodiment.
Figure 4:
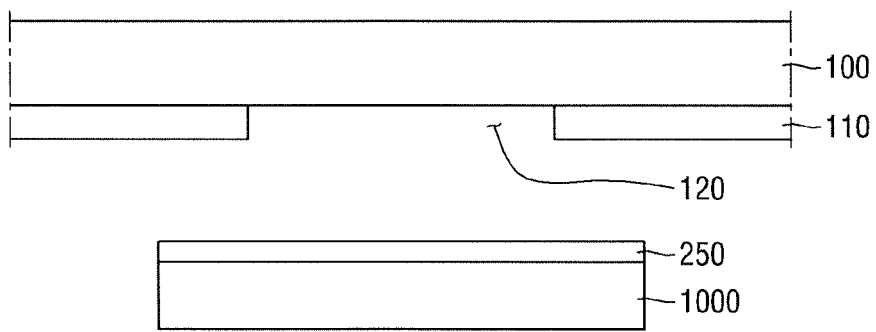
FIG. 4 illustrates a cross-sectional view of the display device taken along the line A-A' of FIG. 1 according to the embodiment.
Figure 5:
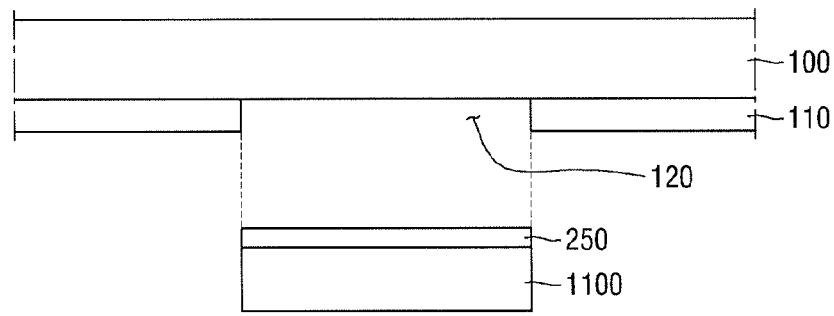
FIG. 5 illustrates a cross-sectional view of the display device taken along the line A-A' of FIG. 1 according to another embodiment.
Figure 6:
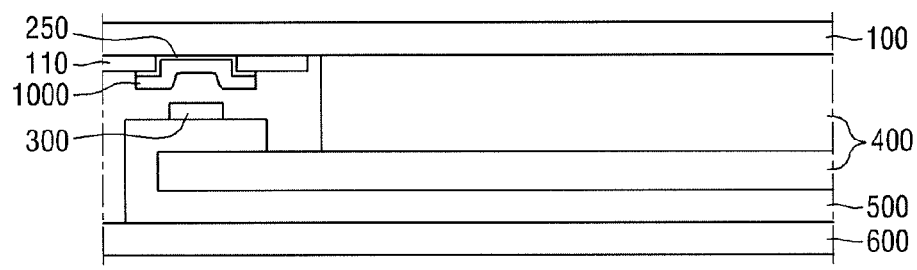
FIG. 6 illustrates a cross-sectional view of the display device according to the embodiment.
Figure 7:
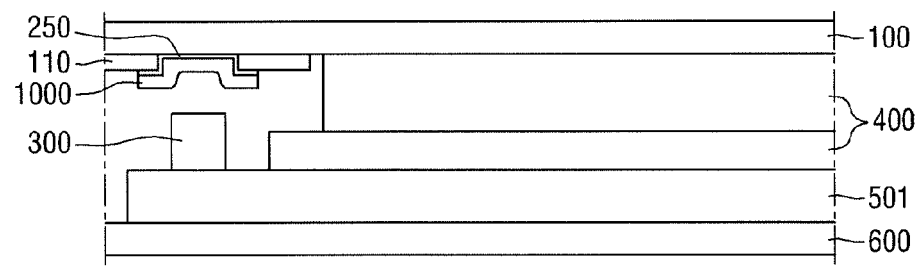
FIG. 7 illustrates a cross-sectional view of a display device according to yet another embodiment.
Figure 8:
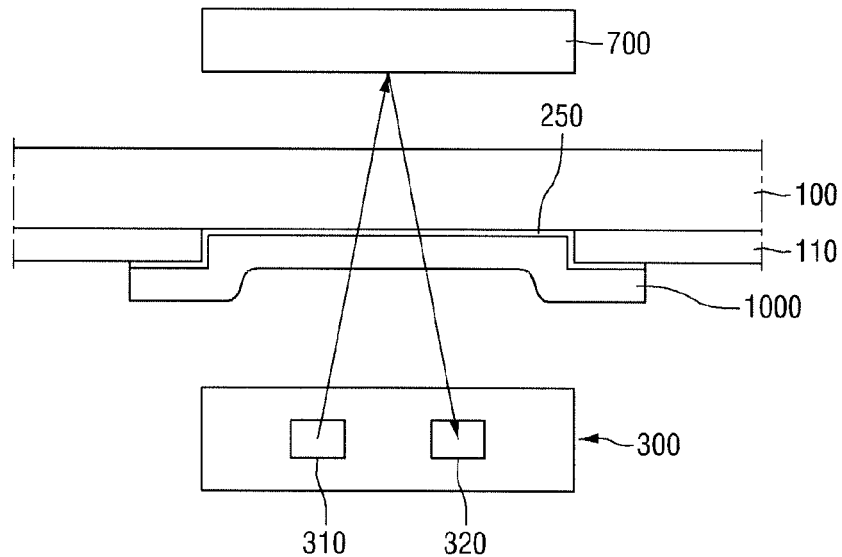
FIG. 8 illustrates a cross-sectional view schematically of the operating principle of the optical sensor member of the display device according to the embodiment.

FIG. 1 illustrates an exploded perspective diagram of a display device according to an embodiment. FIG. 2 illustrates a perspective view of a polarizing member according to the embodiment. FIG. 3 illustrates a cross-sectional view of the polarizing member according to the embodiment. FIG. 4 illustrates a cross-sectional view of the display device taken along the line A-A' of FIG. 1 according to the embodiment. FIG. 5 is a cross-sectional view of the display device taken along the line A-A' of FIG. 1 according to another embodiment. FIG. 6 illustrates a cross-sectional view of the display device according to the embodiment. FIG. 7 illustrates a cross-sectional view of a display device according to yet another embodiment. FIG. 8 illustrates a cross-sectional view schematically illustrating the operating principle of the optical sensor member of the display device according to the embodiment.

Referring to FIG. 1, a display device 10 according to an embodiment includes a display panel 400, a circuit board 500 beneath the display panel 400, an optical sensor member 300 on the circuit board 500, a housing 600 accommodating the display panel 400 and the circuit board 500, a cover window 100 on the display panel and the circuit board 500, and a polarizing member 1000 arranged adjacent a first surface of the cover window 100, e.g., the surface facing the display panel 400, such that the polarizing member 1000 may correspond to the optical sensor member 300.

The display panel 400 may display an image. The display panel 400 may be various display panels such as an organic light emitting diode (OLED) display panel, a liquid crystal display (LCD) panel, an electrophoretic display (EPD) panel and an electrowetting display (EWD) panel, however, the display panel 400 is not limited thereto.

As shown in FIG. 1, the circuit board 500 may be arranged to cover a side surface of the display panel 400 in the thickness direction of the display panel 400, and may extend from the side surface of the display panel 400 so as to cover at least a part of a surface of the display panel 400 adjacent to an upper edge of the side surface of the display panel 400 and cover at least a part of a surface of the display panel 400 adjacent to a lower edge of the side surface of the display panel 400. Specifically, the circuit board 500 may cover a part of the surface of the display panel 400 adjacent to one edge of the surface of the display panel 400 facing the cover window 100, and may extend to the side surface of the display panel 400 adjacent to the one edge and further to a lower surface of the display panel 400 adjacent to the side surface of the display panel 400.

The display board 500 may be electrically connected to the display panel 400, and may include a driving element for driving the display panel 400, a signal control device for controlling a signal, and a switching mode power supply (SMPS).

The cover window 100 may be arranged on the display panel 400, and may be coupled to the housing 600 to form an outer appearance of the display device 10 together with the housing 600. The display panel 400 may be coupled to the cover window 100.

The cover window 100 may include a display region P1 with a flat shape in which the image projected from the display panel 400 is displayed, and a non-display region P2 surrounding the display region P1. The non-display region P2 is a region in which the image projected from the display panel 400 is not displayed. For example, as shown in FIG. 4, a color layer 110 is not formed on a part of one surface of the cover window 100 corresponding to the display region P1 so as to allow light to pass, and the color layer 110 is formed on a part of one surface of the cover window 100 corresponding to the non-display region P2 so as to at least partially block light. In a case where the color layer 110 is formed of an opaque material, incident light may be completely blocked.

A hole 120 may be defined in a portion of the non-display region P2 that overlaps the optical sensor member 300. The hole 120 is defined by the color layer 110 in the non-display region P2. The hole 120 may expose the cover window 100 to pass light.

Although the hole 120 is shown as having a quadrangular shape in FIG. 1, the shape of the hole 120 is not limited and may be a circular, triangular, elliptical or any irregular shape that allows light to pass.

The optical sensor member 300 may be arranged on a surface of the circuit board 500 facing the cover window 100. Specifically, the optical sensor member 300 may be arranged in a portion of the surface of the circuit board 500 facing the cover window 100 and that overlaps the non-display region P2 of the cover window 100.

The housing 600 may accommodate the display panel 400 and the circuit board 500. FIG. 1 illustrates the housing 600 made of one member. However, the housing 600 may be made of two or more members coupled with each other. The housing will hereinafter be explained mainly as being made of one member.

The housing 600 may further accommodate a power supply such as a battery (not shown) in addition to the display panel 400 and the circuit board 500.

The housing 600 may be produced by injection molding a synthetic resin, and may be formed of a metal material, for example, stainless steel or titanium, however, the housing 600 is not limited thereto.

Referring to FIG. 1 and FIG. 4, the color layer 110 is formed on the first surface of the cover window 100 such that the color layer 110 corresponds to at least a part of the non-display region P2. The color layer 110 absorbs or reflects light incident to the other surface of the cover window 100. In FIG. 4, the color layer 110 including a single layer is illustrated. However, the color layer 110 may include two or more layers.

The hole 120 may be defined by the color layer 110, may expose the cover window 100, and may be formed in a portion corresponding to the optical sensor member 300. FIG. 1 to FIG. 8 illustrates a single hole 120 disposed in the portion corresponding to the optical sensor member 300. However, in another embodiment discussed below, two holes 120 may be disposed in the portion corresponding to the optical sensor member 300. A case where a single hole 120 is formed in the region corresponding to the optical sensor member 300 will be explained mainly hereinafter.

Referring to FIG. 2 and FIG. 3, the polarizing member 1000 may be on the first surface of the cover window 100. The polarizing member 1000 may include two laminated polarizing films 200.

In detail, each polarizing film 200 may include a polarizer 210, a first protective layer 220, and a second protective layer 230 which are secured together, e.g., laminated. The first protective layer 220 may be formed on a first surface of the polarizer 210 and the second protective layer 230 may be formed a second surface of the polarizer 210, opposite the first surface.

The polarizer 210 has a polarizing function of transmitting, among incident light, only the light vibrating in one direction and absorbing the light vibrating in another direction. The polarizer 210 may be formed of poly vinyl alcohol (PVA).

The first protective layer 220 and the second protective layer 230 may protect or support the polarizer 210. The polarizer 210 may have improved durability, mechanical strength, heat resistance and humidity resistance by the first protective layer 220 and the second protective layer 230.

At least either the first protective layer 220 or the second protective layer 230 may be formed of triacetyl cellulose (TAC). Furthermore, at least either the first protective layer 220 or the second protective layer 230 may be formed of cellulose acetate trimellitate (CAT). In an exemplary embodiment, the first protective layer 220 may be formed of TAC and the second protective layer 230 may be formed of CAT.

Referring to FIG. 2 and FIG. 3, either of the two polarizing films 200 of the polarizing member 1000 has a polarizing axis arranged in a first polarizing direction D1 and the other of the two polarizing films 200 has a polarizing axis arranged in a second polarizing direction D2.

In this case, an angle (a) formed by the first polarizing direction D1 and the second polarizing direction D2 on the same plane may be 45 degrees to 90 degrees. The quantity of visible light passing through the polarizing member 1000 may be reduced as the angle (a) becomes larger within the range of 0 degree to 90 degrees. In detail, the quantity of visible light passing through the polarizing member 1000 may be reduced as the angle (a) formed by the first polarizing direction D1 and the second polarizing direction D2 on the same plane becomes nearer to 90 degrees.

Meanwhile, infrared light has a wavelength longer than that of the visible light and, thus, has relatively better transmittivity, and thus may readily pass through the polarizing member 1000 even though the angle (a) formed by the first polarizing direction D1 and the second polarizing direction D2 on the same plane is nearer to 90 degrees. For example, if infrared light having a wavelength of 940 nm or more is incident on the polarizing member 1000 of the display device 10 according to the embodiment, transmittivity of 80% or higher may be obtained.

Consequently, the polarizing member 1000 of the display device 10 according to the embodiment may have low transmittivity in a visible light region and high transmittivity in an infrared light region. Therefore, the optical sensor member 300 made invisible from outside may emit and receive infrared light through the polarizing member 1000.

A first adhesive layer 240 may be interposed between the two polarizing films 200 of the polarizing member 1000. The first adhesive layer 240 may join the two polarizing films 200. The first adhesive layer 240 may be transparent. For example, the first adhesive layer 240 may be an optically clear adhesive (OCA). However, the first adhesive layer 240 is not limited thereto, and an optically clear resin (OCR) or any appropriate adhesive may be employed.

In an exemplary embodiment, the first adhesive layer may include a pressure sensitive adhesive (PSA). The PSA may include a curable polymer material. The PSA is formed into a film type including an adhesive, and performs a function of adhesive in response to the pressure provided from an external source. The PSA may include an acryl-based or rubber-based adhesive, or an adhesive in which fine particles such as zirconia are contained in the acryl-based or rubber-based adhesive.

As described above, the polarizing member 1000 may be formed by laminating the two films 200 and, therefore, may have a constant thickness throughout the whole area. Thus, the polarizing member 1000 formed into a film type may be attached to one surface of the cover window instead of an infrared print layer, thereby inhibiting scatter reflection of light emitted from the optical sensor member 300.

Referring to FIG. 4, the color layer 110 is formed at the first side of the cover window 100 to define the hole 120. The polarizing member 1000 of the display device 10 according to the embodiment may have an area larger than that of the hole 120. A second adhesive layer 250 is interposed between the polarizing member 1000 and the cover window 100 so as to attach the polarizing member 1000 to the cover window 100. Although the second adhesive layer 250 is formed on the polarizing member 1000 in FIG. 4, it is also possible to form the second adhesive layer 250 at the first surface of the cover window 100. The polarizing member 1000 is disposed at the cover window 100 exposed by the hole 120 and may extend onto the portion of the color layer 110 adjacent the hole 120.

As shown in FIG. 5, a polarizing member 1100 may have an area same as that of the hole 120 according to another embodiment. As the polarizing member 1100 according to another embodiment has the area same as that of the hole 120, the polarizing member 110 may be disposed at the cover window 100 exposed by the hole 120 and may not extend onto the color layer 110.

In a case where the polarizing member 1000 of FIG. 4 is used, the cover window 100 may not be exposed by virtue of a predetermined margin even when an error arises at the point of attaching the polarizing member 1000 to the cover window 100, while when the polarizing member 1100 of FIG. 5, defects of exposing the cover window 100 may occur when an error arises at the point of attaching the polarizing member 1100. However, when the polarizing member 1100 of FIG. 5 is used, consumption of the material for manufacturing the polarizing member 1100 may be reduced as compared with the polarizing member 1000 of FIG. 4.

Referring to FIG. 1 and FIG. 6, the optical sensor member 300 may be adjacent the first surface of the cover window 100 and the polarizing member 1000 may be on the first surface of the cover window 100. Specifically, the optical sensor member 300 may be arranged adjacent the first surface of the cover window 100 such that the optical sensor member 300 corresponds to the hole 120, and the polarizing member 1000 may be arranged at the first surface of the cover window 100 facing the optical sensor member 300. That is, the polarizing member 1000 and the optical sensor member 300 may be arranged in the region that overlaps the hole 120. The display panel 400, the circuit board 500, and the housing 600 are described in detail above, and therefore, duplicated descriptions thereof will not be repeated.

FIG. 7 illustrates a cross-sectional view of a modified embodiment of the display device of FIG. 6. The display device of FIG. 7 is similar to the display device of FIG. 6, except that a circuit board 501 may not cover the side surface of the display panel 400 and may be disposed only at the surface of the display panel 400 facing the housing 600. In this case, the optical sensor member 300 may be disposed on a portion of the surface of the circuit board 501 facing the cover window 100, the portion having no display panel 400 disposed thereon.

Referring to FIG. 1, FIG. 4, and FIG. 8, the optical sensor member 300 may be disposed at one surface of the cover window 100, and the polarizing member 1000 may be disposed at the surface of the cover window 100 facing the optical sensor member 300.

The optical sensor member 300 may have a light emitting unit 310 and a light receiving unit 320. In FIG. 1 and FIG. 8, the light emitting unit 310 and the light receiving unit 320 are shown as corresponding to one hole 120, however, the light emitting unit 310 and the light receiving unit 320 may correspond to respective holes 120 different from each other in the display device according to yet another embodiment.

The light emitting unit 310 emits light toward an upper surface of the cover window 100 through the hole 120. A portion of the emitted light may be reflected by an adjacent user 700 and may enter the light sensor member 300 through the hole 120 so as to be received at the light receiving unit 320. Meanwhile, if there is no adjacent user 700, the light emitted through the hole 120 may not be reflected and thus may not return, and therefore, the light may not be sufficiently received at the light receiving unit 320.

In an exemplary embodiment, the light receiving unit 320 may receive both visible light and infrared light. The light receiving unit 320 may receive infrared light to recognize the adjacent user 700 as described above and may measure the intensity of illumination using the visible light.

Figure 9:
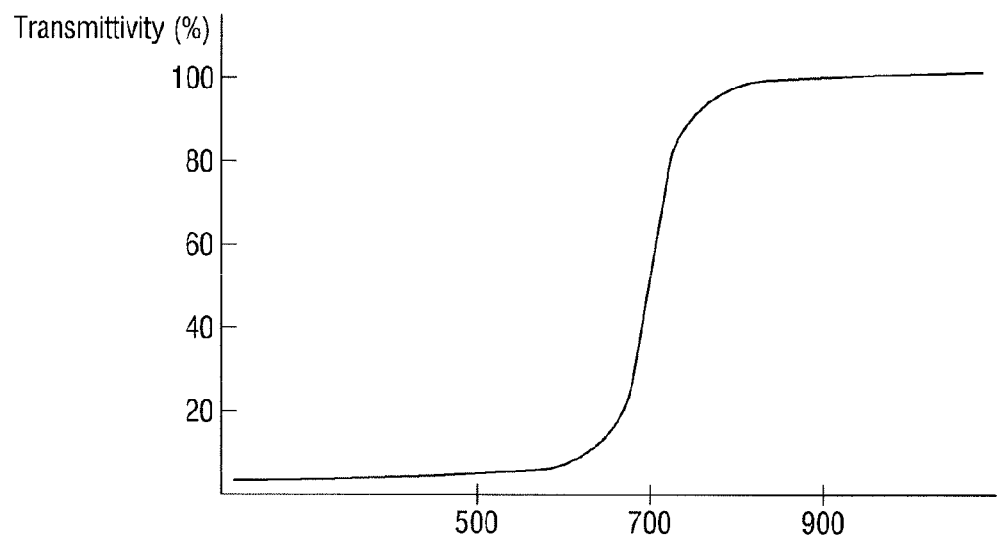
FIG. 9 illustrates a graphical representation of the transmittivity of the polarizing member based on a wavelength according to the embodiment.

FIG. 9 is a graphical representation illustrating the transmittivity of the polarizing member based on a wavelength according to the embodiment.

Referring to FIG. 9, the polarizing member 1000 according to the embodiment may transmit 80% or more of infrared light having a wavelength of 940 nm or more, and may have relatively lower transmittivity of visible light and ultraviolet light. For example, the polarizing member 1000 may have visible light transmittivity of 20% or lower. Thus, the optical sensor member 300 may not be seen from outside, and the optical sensor member 300 may emit and receive infrared light through the polarizing member 1000.

Figure 10:
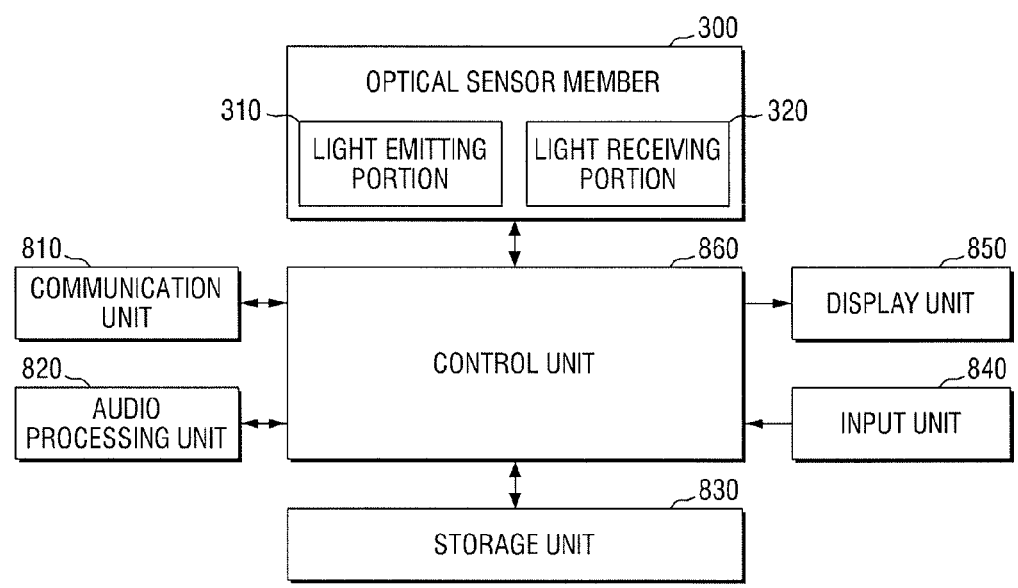
FIG. 10 illustrates a block diagram of the display device according to the embodiment.

FIG. 10 is a block diagram of a power management device of the display device according to the embodiment. Referring to FIG. 10, the power management device of the display device 10 according to the embodiment may include the optical sensor member 300, a communication module 810, an audio processing unit 820, a storage unit 830, an input unit 840, a display unit 850, and a control unit 860.

The optical sensor member 300 may serve to sense the existence of a neighboring user. The optical sensor member 300 according to the embodiment may be a photodiode-based optical sensor member. The optical sensor member 300 may include the light emitting unit 310 and the light receiving unit 320, wherein the light emitting unit 310 may include light emitting diodes (LEDs) and the light receiving unit 320 may include photodiodes. Specifically, the light emitting unit 310 may include infrared light emitting diodes (IR LEDs), and the light receiving unit 320 may include photodiodes for absorbing infrared light.

The light receiving unit 320 may change the absorbed light to a current, and may convert the obtained current to a digital value through an analog-to-digital (ADC) converter. In an exemplary embodiment, the digital value may be composed of 16-bit (65,536) counter values. The light receiving unit 320 may measure only the light emitted from the light emitting unit 310 and reflected by a user. The light receiving unit 320 may send the measured quantity of received light to the control unit 860. The measured quantity of received light may be used as a criterion for determining whether an adjacent user exists.

The communication unit 810 may transmit/receive data for wireless communication of the display device. The communication unit 810 may include an RF transmitter for up-converting and amplifying the frequency of a signal being transmitted, an RF receiver for low-noise amplifying a received signal and down-converting the frequency, and the like. Furthermore, the communication unit 810 may receive data via a wireless channel and output the received data to the control unit 860, and may transmit the data output from the control unit 860 via the wireless channel.

The audio processing unit 820 may include a codec, wherein the codec may include a data codec for processing packet data or the like and an audio codec for processing an audio signal, e.g., a speech signal or the like. The audio processing unit 820 may convert a digital audio signal into an analog audio signal via the audio codec such that the analog audio signal may be reproduced via a speaker, and may convert the analog audio signal input from a microphone into a digital audio signal via the audio codec.

The storage unit 830 may store therein a program and data required for an operation of the display device, and may be divided into a program section and a data section. The storage unit 830 may include volatile storage media and/or nonvolatile storage media. Volatile storage media may include a semiconductor memory such as RAM, DRAM, SRAM, and nonvolatile storage media may include a hard disk.

The storage unit 830 according to the embodiment may include a compensation amount storage portion. The compensation amount storage portion may store therein a range of the quantity of received light and a compensation amount corresponding to the range, the received light being measured at the state where an object is not close to the optical sensor member 300 (i.e., open state). To maintain a proximity recognition distance of the display device constant, it is required that the reference value for proximity recognition (threshold quantity of received light for proximity recognition) needs to be adjusted depending on conditions. Embodiments may measure the quantity of received light at the open state and reset a proximity recognition reference value based on the measured quantity of received light, and in this case, the compensation amount may be a compensation value of the quantity of received light required for calculating a proximity recognition reference value from the quantity of received light measured at the open state.

The proximity recognition reference value of embodiments may be reset whenever a user inputs a key for sending a call or a key for responding to a received call, and the storage unit 830 may store the reset proximity recognition reference value.

The input unit 840 may receive, as an input, a key operating signal of a user for controlling the display device, and send the received signal to the control unit 860. In a case where the display device is a touch screen-based display device, the input unit 840 may be built in the display unit 850. The input unit 840 may generate input signals for executing functions of the display device according to a user input, and send the generated input signals to the control unit 860.

The display unit 850 may be a liquid crystal display (LCD) and may provide menu, input data, function set information and other various information of the display device to a user. For example, the display unit 850 may display a booting screen, a stand-by screen, a display screen, a communication screen, and other application executing screens of the display device.

The control unit 860 may control an overall operation of the display device and a signal flow among internal blocks of the display device. The control unit 860 may control, upon recognition of a user key input (a key for entering a dial mode, a numeral key after entry to the dial mode, a key for selecting a phone directory function, or a key for responding to a received call) through the input unit 840, the light emitting portion 310 to emit light and control the light receiving portion 320 to measure the quantity of received light with respect to the light emitted by the light emitting portion 310. The light receiving unit 320 may send the measured quantity of received light to the control unit 860, the control unit 860 may then extract a compensation amount corresponding to the received measured quantity of received light from the storage unit 830 and compensate the received measured quantity of received light by the extracted compensation amount. The control unit 860 may set the quantity of received light that has been undergone compensation as a proximity recognition reference value and store the set proximity recognition reference value in the storage unit 830. After setting the proximity recognition reference value, the control unit 860 may control the light emitting portion 310 to emit light, may control the light receiving portion 320 to measure the quantity of received light with respect to the light emitted by the light emitting portion 310, and may compare the measured quantity of received light and the stored proximity recognition reference value so as to recognize a proximity of an object.

Figure 11:
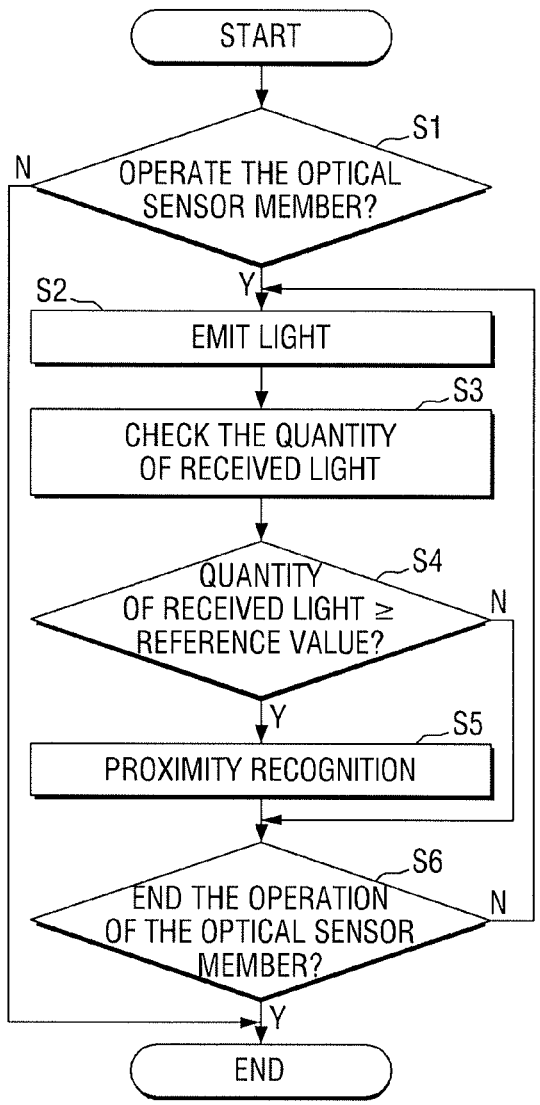
FIG. 11 illustrates a flow chart of a power management method of the display device according to the embodiment.

FIG. 11 illustrates a flow chart of a power management method of the display device according to the embodiment.

Referring to FIG. 8 and FIG. 11, the display device 10 determines whether to operate the optical sensor member 300 (S1). For example, if a user tries to make a call, the optical sensor member 300 may be operated. If it is determined not to operate the optical sensor member 300, the display device ends this algorithm.

If the optical sensor member 300 operates, the display device 10 projects light (S2). If the optical sensor member 300 operates, the light emitting portion 310 of the optical sensor member 300 emits light.

After the light emission, a quantity of received light is checked (S3). The light receiving portion 320 of the optical sensor member 300 may receive a larger quantity of light when the light emitted by the light emitting portion 310 is reflected by a user, and may receive a relatively smaller quantity of light when the light emitted by the light emitting portion 310 is not reflected by a user.

Subsequently, the quantity of received light and a reference value are compared (S4). If the quantity of received light is smaller than the reference value, the display device 10 recognizes that the user is not near and determines whether to end the operation of the optical sensor member 300 (S6). If the quantity of received light is equal to or larger than the reference value, the display device 10 goes to a proximity recognition step (S5) to recognize that the user is near. For example, if it is recognized that the user is near, the display device 10 stops displaying on the screen.

After recognizing that the user is near, the display device 10 determines whether to end the operation of the optical sensor member 300 (S6). For example, if the optical sensor member 300 operates when the user tries to make a call, the display device 10 checks whether the user has ended the call. The display device 10 determines to end the operation of the optical sensor member 300 if the user has ended the call. Meanwhile, the display device 10 determines not to end the operation of the optical sensor member 300 if the user is still on the phone.

If the display device 10 determines not to end the operation of the optical sensor member 300, the algorithm returns to emit light (S2).

If the display device 10 determines to end the operation of the optical sensor member 300, the algorithm ends. For example, if the user ends the communication and the operation of the optical sensor member 300 ends after recognizing that the user is near (S5) and displaying on the screen ends, then displaying on the screen may be activated.

With the power management method described above, the display device 10 may stop displaying on the screen while the user is talking on the phone, thereby reducing power consumption.

Figure 12:
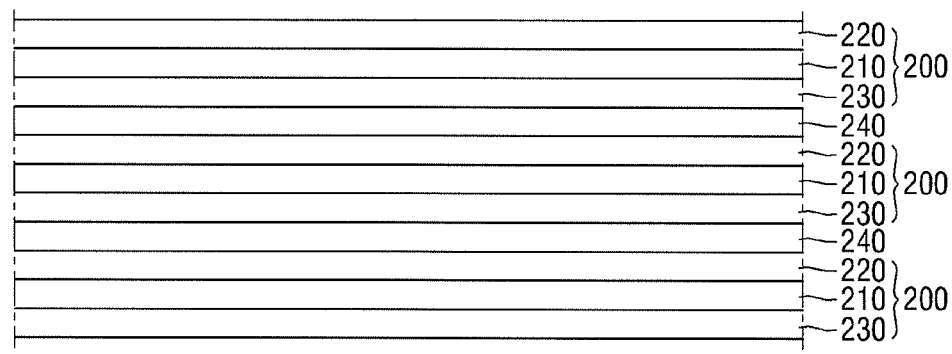
FIG. 12 illustrates a cross-sectional view of a polarizing member according to still another embodiment.

FIG. 12 illustrates a cross-sectional view of a modified embodiment of the polarizing member of FIG. 2 and FIG. 3. A polarizing member 1200 of FIG. 12 is similar to the polarizing member 1000 of FIG. 2 and FIG. 3, except that the polarizing member 1200 includes three polarizing films instead of two polarizing films. Each polarizing film 200 includes the polarizer 210, the first protective layer 220, the second protective layer 230, and the first adhesive layer 240 described in detail above, and therefore, duplicated descriptions thereof will not be repeated.

The polarizing member 1200 including laminated three polarizing films may have polarizing axes in different directions. The polarizing member 1200 including three polarizing films on the principle same as those of the polarizing member 1000 shown in FIG. 2 and FIG. 3 has low transmittivity in an ultraviolet light region and a visible light region and high infrared light transmittivity. Thus, the optical sensor member 300 may not be seen from outside, and may emit and receive infrared light through the polarizing member 1200.

As described above, the polarizing member 1200 is formed by laminating three polarizing films 200, and therefore, has a constant thickness throughout the whole area. Thus, the polarizing member 1200 formed into a film type may be attached to one surface of the cover window instead of an infrared print layer, thereby inhibiting scatter reflection of light emitted from the optical sensor member 300.

Figure 13:
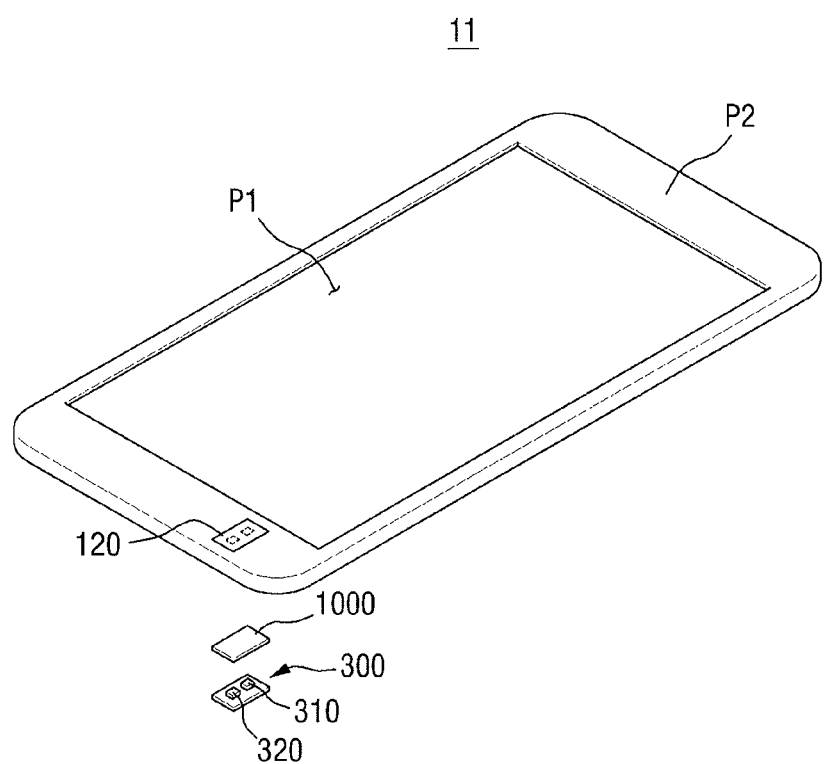
FIG. 13 illustrates a perspective view of a display device according to yet still another embodiment.

FIG. 13 is a perspective view schematically illustrating a modified embodiment of the display device of FIG. 1. A display device 11 of FIG. 13 is similar to the display device 10 of FIG. 1, except that the light emitting portion 310 and the light receiving portion 320 of the light emitting member 300 are arranged in the lengthwise direction of the two relatively longer edges among edges forming an interface between the display region P1 and the non-display region P2.

As shown in the drawing, the hole 120 may have a location and a shape corresponding to those of the light emitting portion 310 and the light receiving portion 320. In an exemplary embodiment, the light emitting portion 310 and the light receiving portion 320 may be interchangeable with each other, i.e., the light emitting portion 310 and the light receiving portion 320 may be arranged differently from those shown in FIG. 13.

Figure 14:
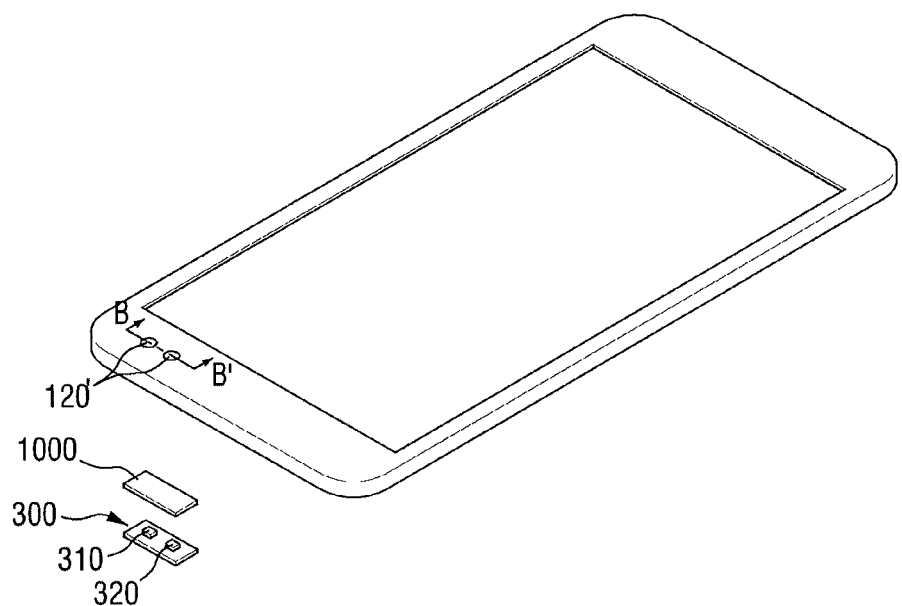
FIG. 14 illustrates a perspective view of a display device according to yet still another embodiment.

FIG. 14 illustrates a perspective view of a modified embodiment of the display device of FIG. 1. Referring to FIG. 14, a display device 12 according to yet still another embodiment is similar to the display device 10 of FIG. 1, except that the display device 12 has two holes 120' instead of one hole 120. Each hole 120' is arranged to correspond to the light emitting portion 310 and the light receiving portion 320, respectively. In an exemplary embodiment, the light emitting portion 310 and the light receiving portion 320 may be interchangeable with each other, i.e., the light emitting portion 310 and the light receiving portion 320 may be arranged differently from those shown in FIG. 14. The polarizing member 1000 and the optical sensor member 300 are described in detail above, and therefore, duplicated descriptions thereof will not be repeated.

Figure 15:
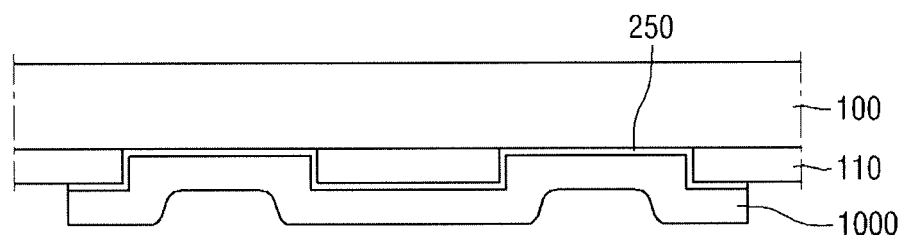
FIG. 15 illustrates a cross-sectional view of the display device taken along the line B-B' of FIG. 14 according to yet still another embodiment.

FIG. 15 illustrates a cross-sectional view of the display device of FIG. 14 taken along the line B-B' of FIG. 14.

Referring to FIG. 14 and FIG. 15, a color layer 110 is formed at one surface of the cover window 100 to define two holes 120. In this case, the polarizing member 1000 may be arranged to cover both the cover window 100 and the color layer 110, the cover window 100 being exposed by the two holes 120, and the color layer 110 being adjacent the circumferences of the two holes 120.' The polarizing member 1000 may be a single member and may be on the color filter 110 between the holes 120'. The adhesive 250 is coextensive with the polarizing member 1000. The adhesive layer 250 is described in detail above, and therefore, duplicated explanations thereof will not be repeated.

Figure 16:
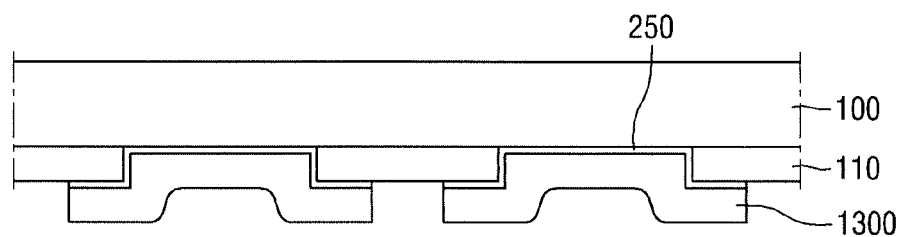
FIG. 16 illustrates a cross-sectional view of the display device taken along the line B-B' of FIG. 14 according to yet still another embodiment.

FIG. 16 illustrates a cross-sectional view of a modified embodiment of the polarizing member of FIG. 15. Polarizing members 1300 of FIG. 16 are similar to the polarizing member 1000 of FIG. 15, except that two polarizing members 1300 are arranged to correspond to two holes 120', respectively.

By way of summation and review, one or more embodiments provide a display device which inhibits scatter reflection of light emitted from a light sensor member. One or more embodiments provide a display device in which the transmittivity of infrared light emitted from an optical sensor member is improved and the transmittivity of visible light is lowered.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device comprising:
    a cover window having a display region and a non-display region surrounding the display region on a same plane;
    an optical sensor member including a light emitting portion and a light receiving portion, the optical sensor member being adjacent a first surface of the cover window and overlapping the non-display region, wherein the light receiving portion is to receive light output from the display device by the light emitting portion and reflected back to the display device;
    a color layer on a portion of the first surface of the cover window facing the optical sensor member, the portion overlapping the non-display region, the color layer defining at least one hole corresponding to the optical sensor member; and
    a polarizing member corresponding to the optical sensor member and on the first surface of the cover window exposed by the hole, wherein the polarizing member has transmittivity of 80% or higher of infrared light having a wavelength of 940 nm or more, wherein the polarizing member has an area equal to that of the hole and fully inserted into the hole.

2. The display device as claimed in claim 1, wherein each polarizing film comprises:
    a polarizer;
    a first protective layer on a first surface of the polarizer; and
    a second protective layer on a second surface of the polarizer, opposite the first surface.

3. The display device as claimed in claim 2, wherein at least either the first protective layer or the second protective layer is formed of triacetyl cellulose (TAC) or cellulose acetate trimellitate (CAT).

4. The display device as claimed in claim 1, wherein the polarizing member comprises a first polarizing film and a second polarizing film, wherein an angle formed by a first polarizing direction of the first polarizing film and a second polarizing direction of the second polarizing film is 45 degrees to 90 degrees.

5. The display device as claimed in claim 1, wherein the polarizing member includes a plurality of polarizing films laminated together.

6. The display device as claimed in claim 5, wherein a first adhesive layer is interposed between the plurality of polarizing films.

7. The display device as claimed in claim 1, wherein a second adhesive layer is interposed between the surface exposed by the hole and the polarizing member.

8. The display device as claimed in claim 1, wherein the light emitting portion and the light receiving portion are arranged in parallel to the lengthwise direction of two relatively shorter edges among edges forming an interface between the display region and the non-display region.

9. The display device as claimed in claim 1, wherein the light emitting portion and the light receiving portion are arranged in parallel to the lengthwise direction of two relatively longer edges among edges forming an interface between the display region and the non-display region.

10. The display device as claimed in claim 1, wherein the at least one hole is two holes in the color layer, the two holes corresponding to the light emitting portion and the light receiving portion of the optical sensor member, respectively.

11. The display device as claimed in claim 10, wherein the polarizing member is a single member that is wider than both holes.

12. The display device as claimed in claim 11, wherein the polarizing member covers the color layer between the two holes.

13. The display device as claimed in claim 11, wherein the polarizing member is on all portions of the first surface of the cover window exposed by the two holes.

14. The display device as claimed in claim 10, wherein the polarizing member includes two polarizing members corresponding to each of the two holes.

15. The display device as claimed in claim 14, wherein each polarizing member has an area wider than each hole and extends onto the color layer.

16. The display device as claimed in claim 1, wherein the at least one hole is a single hole in the color layer that corresponds to both the light emitting portion and the light receiving portion of the optical sensor member.

17. The display device as claimed in claim 1, wherein the polarizing member has a transmittivity of 20% or less for visible light.

* * * * *